UNITED STATES PATENT OFFICE.

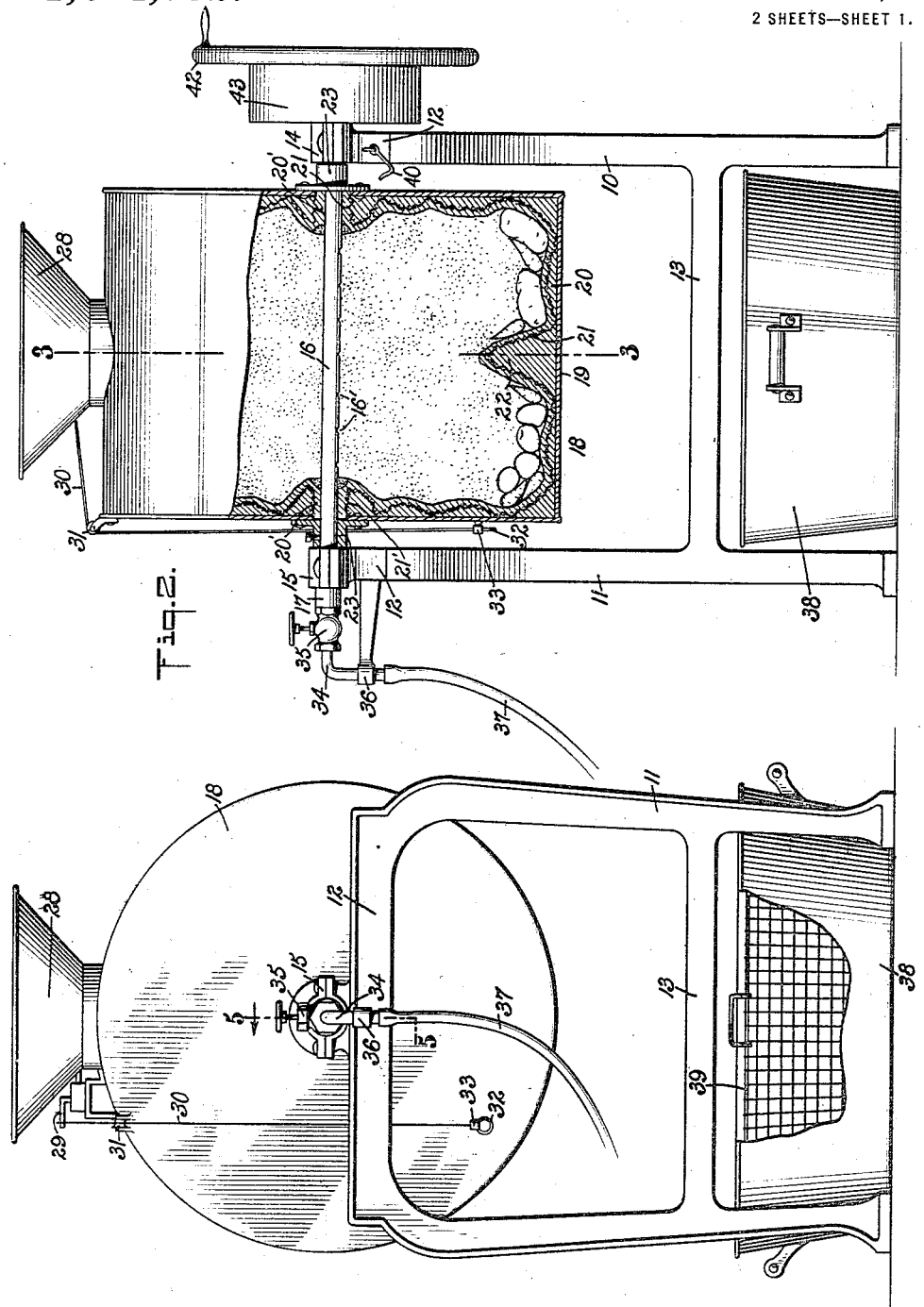

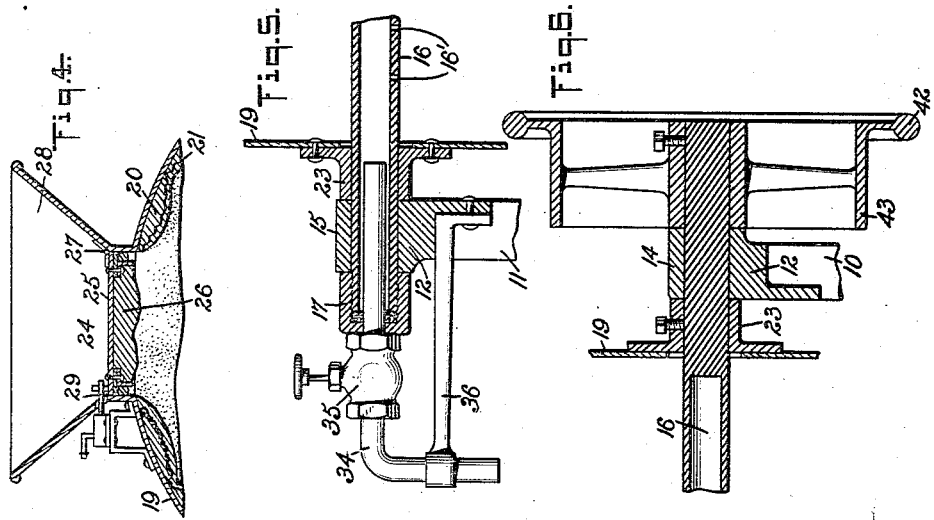

JOHN HENRY HAMLIN, OF NEW YORK, N. Y., ASSIGNOR TO BRAMHALL DEANE COMPANY, OF NEW YORK, N. Y., A CORPORATION OF NEW YORK.

FRUIT AND VEGETABLE PEELING MACHINE.

1,244,452.  Specification of Letters Patent.  Patented Oct. 23, 1917.

Application filed April 26, 1917. Serial No. 164,759.

*To all whom it may concern:*

Be it known that I, JOHN H. HAMLIN, a citizen of the United States, and resident of the city of New York, borough of Manhattan, county and State of New York, have invented a new and Improved Fruit and Vegetable Peeling Machine, of which the following is a full, clear, and exact description.

This invention relates to vegetable peelers and has particular reference to means for peeling potatoes or similar vegetables by an abrasive action.

Among the objects of this invention is to provide a machine adapted for rapid operation and so designed as to treat large quantities of potatoes in a thorough manner and yet with the minimum amount of waste of the vegetables.

Another object of the invention is to provide a machine adapted for the manipulation of the potatoes in a body of water, the potatoes and water being retained together as a single mass during the treatment of the potatoes, whereby the operation is facilitated, the entire mass being delivered from the machine for the separation of the potatoes from the parings and water.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a preferred embodiment of the invention.

Fig. 2 is an edge elevation of the same with a part of the drum broken away along a vertical plane coinciding with the axis of the machine.

Fig. 3 is a vertical transverse section substantially on the line 3—3 of Fig. 2, but with the drum inverted, as in the act of dumping the contents thereof into the tray or receptacle beneath.

Fig. 4 is a vertical transverse sectional detail indicating the manner of holding the closure shut.

Fig. 5 is a detail view substantially on the line 5—5 of Fig. 1 indicating the water inlet and bearing support adjacent thereto.

Fig. 6 is a sectional detail view of the opposite bearing support.

Fig. 7 is a detail view of the keeper for the closure block; and

Fig. 8 is a detail view showing means for locking the drum in upright position.

Referring now more particularly to the drawings I show a rigid frame of any suitable construction comprising right and left standards 10 and 11 respectively each having a horizontal crossbar 12 and any suitable cross braces 13 to make the same rigid and sufficiently strong with a minimum amount of material.

At the central portions of the crossbars 12 are supported right and left bearings 14 and 15 respectively, the axes of which are in horizontal alinement. In the bearings is journaled a hollow shaft 16 one end of which is closed where it projects through the bearing 14 while the other end and intermediate portions thereof are open or tubular. The intermediate portion of the shaft is provided with a series of jet holes 16', the open end of the shaft being journaled in the bearing 15 and provided with a packing gland 17 screw threaded thereon to make it watertight.

The main portion of my improvement comprises a drum 18 shown as substantially of cylindrical form supported upon the shaft 16 and coaxial therewith. This drum is made preferably of some suitable strong thin material such as sheet metal indicated at 19 and is imperforate except where the shaft passes through and also where the closure is provided about the center of the cylinder longitudinally of its axis. The interior of the drum is lined in a peculiar manner as indicated at 20 with a composition having considerable body and weight lined with a strip of reinforcement material 21 and having a surface composed of or impregnated with an abradant preferably of a material now well known on the market as "Hamlinite," of a sharp granular material having some of the characteristics of a carborundum. In addition to the abrasive facing of the lining for the drum it is to be noted that the body of lining is so constructed as to provide convolutions or irregularities of different sizes or shapes forming an undulating surface extending longitudinally and transverse of the drum and a plurality of protuberances 22 of considerable altitude extending radially toward the axis of the drum and arranged midway between the ends of the drum, forming pockets on opposite sides of the protuberances. The undulations permit a larger portion of each potato at one time to engage the abrasive surface of the drum than a plain surface, and the protuberances move the potatoes toward the ends of the drum into the pockets, thereby giving to them a movement at right angles to that given by the rotation of the drum. Adjacent to the hub portions of the drum the lining member 20 is provided with the hub lining member 20′ surrounded with tubular enlargements 21′ of the reinforcement material. The axial apertures for the shell of the drum are surrounded or closed by means of thimbles 23 secured rigidly to the drum and fixed in any suitable manner upon the shaft. The outer or opposite ends of the thimbles abut against the inner faces of the bearings 14 and 15, whereby the drum is held from endwise movement.

The closure 24, above referred to, comprises a metal base 25 and a lining member 26 of a character somewhat similar to the lining body 20 and faced if desired with the abradant. This closure is hinged at 27 to one side of the hopper mouth 28 of the drum and is adapted to be locked closed by means of a hasp 29 at the side opposite the hinge. A flexible line 30 leads from the hasp over a pulley 31 at one side of the drum and the end of the line is provided with a ring 32 for manipulating it, said ring being adapted to coöperate with the keeper 33 carried by the drum, whereby when the closure is locked shut the holding means therefor will rotate in unison with the drum.

34 indicates a nozzle projecting axially into the open end of the shaft 16 through the packing gland 17 thereof. This nozzle is provided with a globe valve or its equivalent 35 to control the admission of water to the shaft 16 and thence therethrough into the drum through the jets 16′. The nozzle member is bent at substantially a right angle and held from rotation by means of a bracket 36 secured to one of the cross bars 12. Any suitable hose or tube 37 may be connected to the outer end of the nozzle member to convey the water from any desired source.

The frame is so designed as to accommodate a pan or receptacle 38 beneath it in which is fitted a reticulated tray 39.

40 indicates a hook carried by one of the cross-bars 12 and adapted to coöperate with an eyelet 41 carried by the drum to hold the drum stationary in any desired position.

The operation of the machine may be briefly summarized as follows: In view of the foregoing specific description with the drum held with its upper mouth 28 elevated and the closure 24 thrown open, a quantity of potatoes, for example, are introduced into the drum, the potatoes preferably just about one half filling the same though a smaller number may be treated with good advantage. The valve 35 is then opened to admit water into the drum to just about cover the potatoes when the valve will be closed again. The drum is then rotated at a moderate rate of speed by any suitable power or hand means applied to the end of the shaft 16 opposite the nozzle. The means indicated comprises a combined hand wheel 42 and pulley 43 keyed or otherwise secured to the end of the shaft. As a result of the rotation of the drum the mass of potatoes and water is caused to guide relatively along or over the abrasive lining surface of the drum and at the same time the potatoes are moved by the protuberances toward the ends of the drum, and owing to these two movements and the undulations practically all surfaces of the potatoes are presented to the abradant whereby the peel or skin thereof is all quickly and effectively removed, with a very slight loss of potato. At the expiration of a few minutes this operation will be completed, when the closure will be unlocked and with the drum turned so as to bring the hopper mouth downward, as shown in Fig. 3, the entire mass of water, parings and peeled potatoes will be delivered into the tray 39. When the tray is lifted from the receptacle 38 the water and parings will remain in the receptacle while the peeled potatoes will be carried in the tray. One immediate advantage accruing from the use of a constant mixture of water, vegetable and parings, consists in the fact that the sharp, granular, abrasive surface of the drum never becomes clogged or foul.

While I refer herein more or less specifically to the use of the machine as a potato peeler, I wish it to be understood that it is adapted for paring other vegetables as well as certain kinds of fruits, especially fruits designed for canning, which are still in a firm or partially ripened condition.

I claim:

1. In a potato peeling machine, a drum having an undulating abrasive surface extending longitudinally and transversely of the drum.

2. In a potato peeling machine, a drum having an abrasive surface extending longitudinally and transversely of the drum, and provided with protuberances extending toward the axis of the drum.

3. In a potato peeling machine, a drum having an abrasive surface, and provided with protuberances extending toward the axis of the drum and arranged between the ends of the drum, forming pockets on opposite sides of the protuberances.

4. In a potato peeling machine, a drum having an undulating abrasive surface extending longitudinally and transversely of the drum, and provided with protuberances extending toward the axis of the drum and arranged midway between the ends of the drum, forming pockets on opposite sides of the protuberances.

JOHN HENRY HAMLIN.